F. R. ALLEN.
ENVELOP SEALING MACHINE.
APPLICATION FILED JULY 5, 1911. RENEWED JAN. 28, 1916.
1,194,693.
Patented Aug. 15, 1916.
2 SHEETS—SHEET 1.
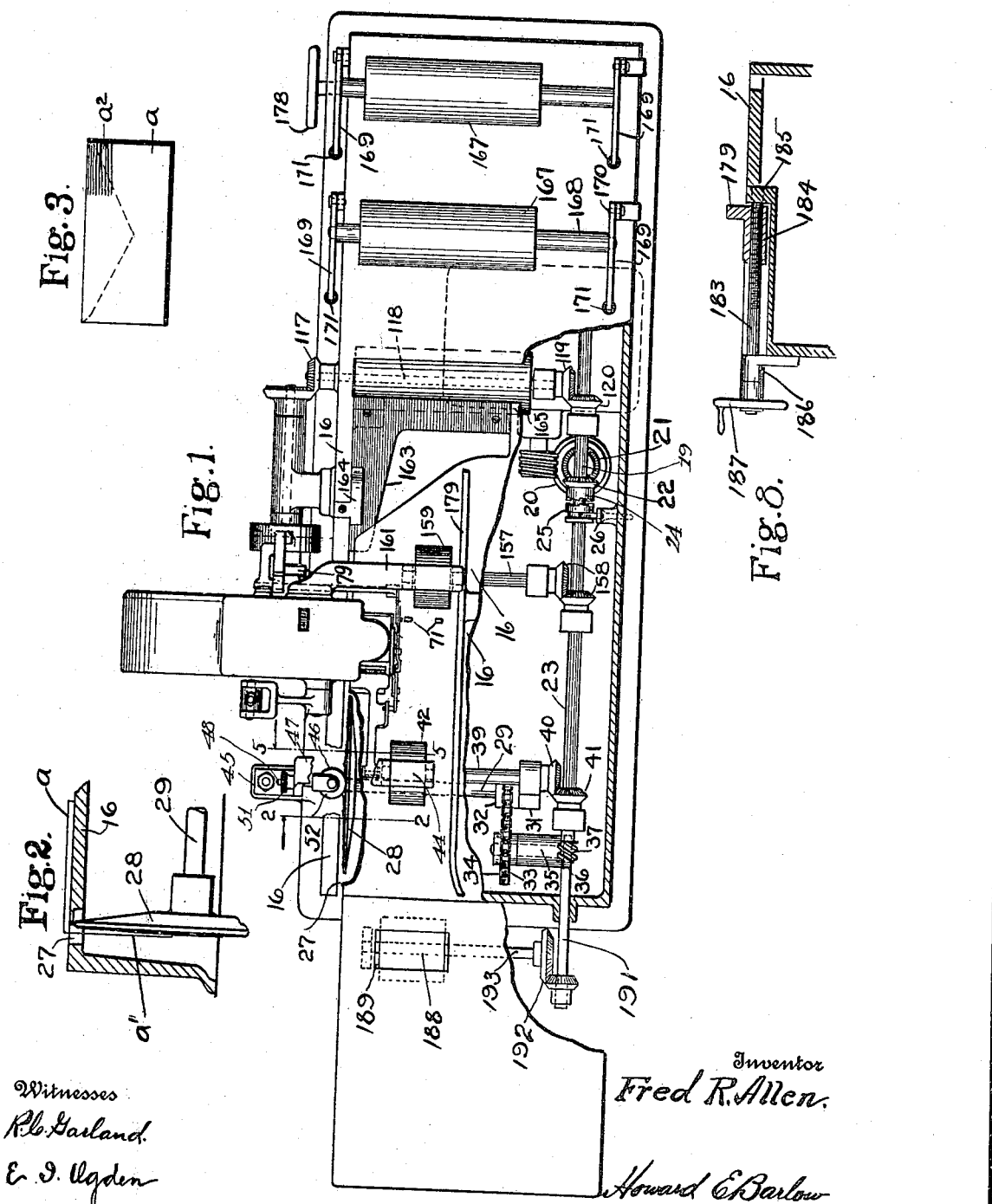
Witnesses
R. C. Garland.
E. J. Ogden.
Inventor
Fred R. Allen.
Howard E. Barlow
Attorney

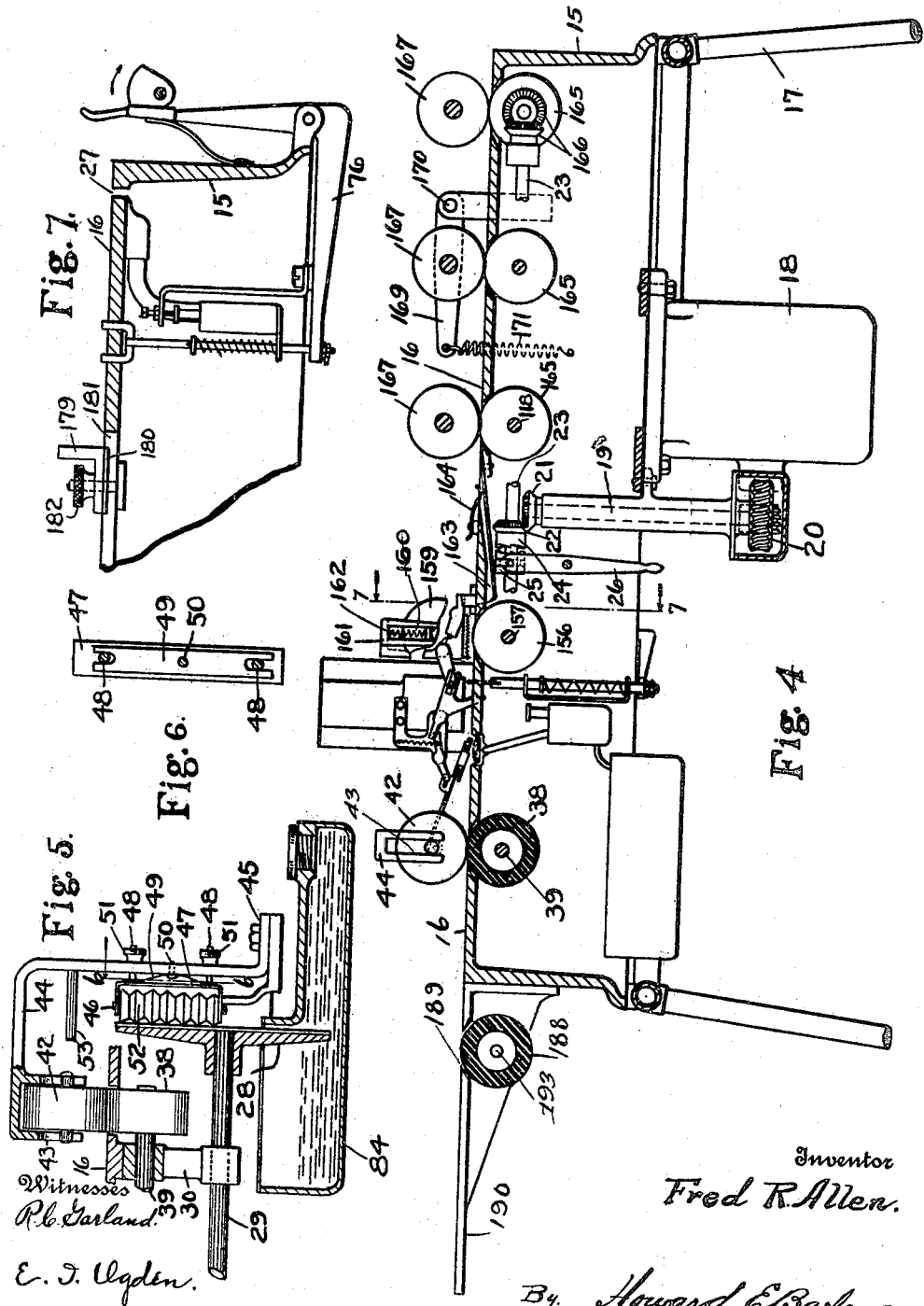

UNITED STATES PATENT OFFICE.

FRED R. ALLEN, OF PROVIDENCE, RHODE ISLAND, ASSIGNOR, BY MESNE ASSIGNMENTS, TO NATIONAL ENVELOPE SEALING AND STAMPING MANUFACTURING COMPANY, A CORPORATION OF MASSACHUSETTS.

ENVELOP-SEALING MACHINE.

1,194,693.  Specification of Letters Patent.  Patented Aug. 15, 1916.

Original application filed March 13, 1911, Serial No. 614,096. Divided and this application filed July 5, 1911, Serial No. 637,014. Renewed January 28, 1916. Serial No. 74,874.

*To all whom it may concern:*

Be it known that I, FRED R. ALLEN, a citizen of the United States, and resident of Providence, in the county of Providence and State of Rhode Island, have invented certain new and useful Improvements in Envelop-Sealing Machines, of which the following is a specification.

This invention relates to power operated mechanism for sealing envelops, and refers particularly to machines of this character which perform all of the operations automatically after the envelop is started through the machine.

With the object of providing an extremely simple, thoroughly practical and rapidly operating and reliable machine of this character the invention consists of certain novel features of construction as will be more fully described and particularly pointed out in the appended claims.

Of the accompanying drawings: Figure 1— is a plan view of a machine embodying my present improvements, a portion of the main table of the machine being broken out to show details of structure beneath. Fig. 2— represents a section on line 2—2 of Fig. 1. Fig. 3— is a plan view of an envelop having a flap that is adapted to be sealed by passing through this machine. Fig. 4— represents a substantially longitudinal section through the machine. Fig. 5— represents an enlarged section on line 5—5 of Fig. 1. Fig. 6— represents a section on line 6—6 of Fig. 5. Fig. 7— represents a detail section on line 7—7 of Fig. 4. Fig. 8— is a modification showing screw actuated means for adjusting the edge guide.

Similar reference characters indicate the same or similar parts in all of the views.

The frame of the machine includes a suitable base 15 and table 16, which may be supported upon any bench or other structure. The drawings however indicate a supporting framework at 17. A casing 18 for an electric motor is suitably supported by the frame on framework, and drives a vertical shaft 19 through a reducing worm gear 20, (see Figs. 1 and 4). A bevel pinion 21 at the upper end of shaft 19 meshes with and drives a bevel pinion 22 which is loosely mounted on a horizontal shaft 23 mounted in suitable bearings under the table 16. The hub of the pinion 22 is provided with clutch teeth 24 which coöperate with teeth of a clutch member 25 splined on shaft 23, so that the shaft 23 will be driven by the motor when the clutch member 24 is shifted to connect with the clutch member 22—24 by means of a suitable operating member 26.

Referring to Figs. 1 and 2, it will be seen that the table 16 is formed with a slot 27 to permit the flap a′ of an envelop a to pass along said slot when the body of the envelop is being fed along on the surface of the table 16. A disk 28 having any suitable surface material to hold sufficient water to moisten the flap a′ of an envelop, is carried by a shaft 29 mounted in bearings in brackets 30, 31 (see Fig. 5 in connection with Fig. 1). The disk is revolved with its lower portion in a reservoir 84 hereinafter described by means of a sprocket 32 on a shaft 29 which sprocket is connected by a chain 33 with a sprocket 34 carried by a short shaft 35, the latter having a worm wheel 36 engaged with and driven by a worm 37 on shaft 23.

The envelop is caused to travel along with its body on the surface of the table and its flap in the position shown in Fig. 2, by means of a pair of wheels or rollers the lower one of which, 38, is preferably rubber surfaced, said wheel 38 being carried by a shaft 39 mounted in the bearings 30, 31, said shaft 39 having a pinion 40 meshing with a pinion 41 on shaft 23. Coöperating with the said wheel 38 is a gravity pressure roll 42, the trunnions of said roll being mounted in slots 43 in a bracket 44, the foot 45 of which is secured to a portion of the frame. It will be understood that when the machine is in operation, the said wheel 38 is constantly driven.

The gravity roll 42 is made of just the requisite weight to hold an envelop on the feed wheel 38 with sufficient pressure to effect the frictional feed of the envelop, but yet permit the said wheel to slip without crumpling or buckling the envelop if for any reason the latter should be stopped. And this effect of the gravity roll 42 remains the same whether the article or package to be sealed and stamped is thick or thin. If springs were employed to effect the pressure of roll 42 upon wheel 38, then the passage of a thick piece of mail matter would result in greater pressure thereon than when a thin piece is passing through.

To hold the gummed surface of the flap $a'$ of the envelop against the moistening surface of the disk 28, I employ a series of independently rotatable disks having sharp edges for a purpose presently explained. As best shown in Fig. 5, a vertical spindle 46 is supported in a U-shaped bracket 47 so that said spindle will be parallel with a radial portion of the moistening disk. The bracket 47 has guide pins 48 projecting through holes in the bracket 44, said pins serving to support the bracket 47 in the position illustrated but so that it can shift somewhat toward and away from the disk 28. A spring 49 secured, as by a screw 50, to the bracket 44, bears at its end against the bracket 47 to yieldingly press the latter toward the face of disk 28, the limit of such movement being adjustably determined by means of nuts 51 having a screw threaded connection with the ends of the pins 48 which project through bracket 44. Loosely mounted on the spindle 46 are sharp edged disks 52, each of said disks excepting the upper one being shown in Fig. 6 as having the form of two truncated cones secured together at their bases, the upper one is also sharp-edged, having the form of a single truncated cone. The especial object and advantage of this structure is that since the several disks 52 are free to possess independent rotation, there will be no friction between them and the face of the moistening disk when there is no envelop flap passing, due to the different rate of speed of the different portions of the disk 28 with which the disks 52 contact. Of course when an envelop flap is passing, all portions of its area are moving at the same speed and then all of the disks 52 will rotate at the same speed. The formation of the disks 52 with sharp edges not only results in less friction during rolling contact with the moistening disk, but the said disks 52 present only thin lines for such contact and they will therefore take less moisture from the disk 28, and consequently will transfer little or no moisture to the outer side of the envelop flap. As indicated by comparing Figs. 1 and 2, a portion of the base or frame 15 is located opposite a sufficient portion of the area of the disk 28 to protect said disk from accidental contact with anything that might injure or affect the same, such portion of the frame therefore constituting a guard for the disk 28.

When an envelop is placed upon the table 16 or on the bracket extension thereof indicated in Figs. 1 and 4, and inserted between the rollers 38 and 42, with its flap over the rear edge of the table so as to be carried in contact with the moistening disk, the said rollers 38, 42 will advance the envelop into the feed rolls 156—159. Said roll 156 is carried by a shaft 157 which has a miter gear connection 158 (Fig. 1) with the main shaft 23 so that the forwarding roll 156 is of course being constantly rotated. The upper roll 159 which causes the envelop to be advanced or forwarded by the roll 156, has its trunnions mounted to slide vertically in slots 160 formed in downwardly projecting arms from a bracket 161, springs such as indicated at 162 being preferably employed to increase the pressure of the upper roll upon the lower one. Since there is never any occasion for permitting a slip at this point, as it is between the rolls 38—42, such springs 162 as mentioned may be used of any strength desired. As the envelop advances under the action of rolls 156 and 159, it leaves a somewhat triangular shaped opening formed in the table 16 as indicated in Fig. 1, so that the flap of the envelop, which has been traveling along the slot 27 in a vertical plane, may be brought up against the underside of the body of the envelop ready to have its gummed and moistened edge pressed to position by the rolls hereinafter described. In order to direct the flap of the envelop upwardly, a flap turner 163 is employed, said flap turner being inclined as indicated by comparing Figs. 1 and 4. The action of this flap turner is such as to sometimes deflect a portion of the envelop upwardly above the surface of the table 16, especially when the envelops are thin, and in that case the advancing edge of the envelop is liable to be not properly taken by the first pair of delivering and pressing rolls presently described. To hold the envelop against being so deflected, I employ a guide 164 which is preferably of spring metal, said guide being attached to a portion of the table and projecting over the inward end of the slot 27 and partially over the triangular opening mentioned in the table 16. It acts as a "hold down" to prevent upward deflection of the envelop as its flap is being turned inwardly and upwardly against the body of the envelop.

The slot 27 communicates, as shown in Fig. 1, with the triangular opening upwardly through which the flap is deflected by the turner 163. After the envelop leaves the moistening disk 28, and until the flap reaches the turner 163, one side of the slot or passageway 27 presented by the thickness of the table 16, serves as a guide for the flap and aids in keeping the envelop moving in a straight line and also holds the portion of the flap which has been moistened out of contact with any surface which would tend to wipe off the moistened gum. In other words, the said portion of the table 16 which forms one side of the slot guides the flap and keeps it free from having any of its moistened gum wiped off.

As shown in Figs. 1 and 4 I preferably employ three pairs of delivering and pressing rolls, the lower rolls being indicated at 165, the shafts of said rolls having miter gear connections with the main shaft 23. Since the lower roll 165 of the first pair is mounted on and carried by the shaft 118 before described, said roll is driven by the pinions or miter gears 119, 120. The other two lower rolls 165 are operated by similar miter gear connections one of them being indicated at 166 in Fig. 4. Each of the upper rolls 167 has its trunnions mounted in arms 169 pivotally connected at 170 to suitable supports or brackets, each arm 169 having its other end held downwardly by a spring 171. Therefore each of the pressing or sealing rolls 167 is yieldingly drawn toward its companion delivering roll 165, and all rotated in unison to rapidly deliver each envelop, and firmly seal the flap thereof by the pressure as the envelop passes between the several pairs of rolls to be finally discharged from the end of the table into any suitable receptacle ready for mailing. The arms 169 constitute levers and they are of such length that long and light springs 171 may be employed, thereby enabling the rolls 167 to be subject to the sensitive and delicate operation of springs of considerable length and lightness.

In order that the machine may be operated by hand if desired, when the lever 26 has been operated to disconnect the clutch members 24, 25, a suitable hand wheel such as indicated at 178 in Fig. 1 may be connected to the shaft of the lower roll 165 of one of the pairs of delivering and sealing rolls. It is found of advantage in passing envelops or post cards rapidly through the machine to have a guide, as indicated at 179, on the surface of the table which may be engaged by the edge of the envelops, and to also provide means whereby this guide may be adjusted. Such a guide is indicated at 179 (Figs. 7 and 8) the foot piece of said guide having a rib 180 engaging the walls of a slot 181 formed in the table 16. Said guide may be secured in its adjusted position relatively to the edge of the table by means of a suitable screw clamp 182, or a screw shaft 183 may be threaded through a nut portion 184 of the guide one end of the screw being journaled in the bearing 185, while the opposite end passes through the bearing 186 and is provided with an operating hand wheel 187 by means of which this guide may be easily and quickly adjusted relatively to the longitudinal edge of the table.

It is found in practice desirable to provide means for automatically feeding the envelops one by one to the operating mechanism to accomplish which in a simple and effective way I have provided a rubber covered friction roll 188, the periphery of which is arranged to extend through a slot 189 in the extension leaf 190. This roll is driven from an extension 191 of the shaft 23 through the bevel gears 192 and short shaft 193. By means of this roll the operator is enabled to place a large package of envelops upon this extension leaf over the roll and by a simple pressure of one finger of the hand retaining the package, the lower envelop is engaged by the rotating friction surface and carried forward into the operating mechanism of the sealer, the balance of the package being retained lightly by the hand of the operator, the frequency of the feeding being thereby readily controlled.

I claim:

1. In an envelop sealing machine, the combination with a rotatable moistener disk, and means for supporting an envelop approximately level with the top of said disk, of a plurality of independent, freely rotatable presser disks mounted on an axis approximately parallel with the radius of said moistener disk, means for yieldingly holding said presser disks against the face of the moistener disk to engage the flap of an envelop, and means for regulating the pressure of the presser disks against the moistener disk.

2. In an envelop sealing machine, the combination with a rotatable moistener disk, and means for supporting an envelop approximately level with the top of said disk, of a spindle substantially parallel with the radius of said moistener disk, means for yieldingly supporting said spindle, and a plurality of sharp edged pressing disks mounted freely upon said spindle.

3. In an envelop sealing machine, the combination with a rotatable moistener disk, and means for supporting an envelop approximately level with the top of said disk, of a spindle substantially parallel with the radius of said moistener disk, means for yieldingly supporting said spindle, a plurality of sharp edged pressing disks mounted freely upon said spindle, and means for limiting movement of said spindle and said pressing disks toward said moistener disk.

4. In an envelop sealing machine, the combination with a rotatable moistener disk, and means for supporting an envelop approximately level with the top of said moistener disk, of a yoke, a spindle supported by said yoke and arranged substantially parallel with the radius of said moistener disk, a plurality of sharp edged presser disks freely mounted upon said spindle, means acting against said yoke to hold said presser disks yieldingly against the face of said moistener disk, and means for limiting the movement of the presser disks toward the moistener disk.

5. In an envelop sealing machine, the combination with a rotatable moistener disk, and means for supporting an envelop approximately level with the top of said moistener disk, of a yoke, a spindle supported by said yoke and arranged substantially parallel with the radius of said moistener disk, a plurality of sharp edged presser disks freely mounted upon said spindle, means acting against said yoke to hold the presser disks yieldingly against the face of said moistener disk, and a support for said yoke provided with means for adjustably limiting the movement of the presser disks toward said moistener disk.

6. In an envelop sealing machine, the combination with a rotatable moistener disk, and means for supporting an envelop approximately level with the top of said moistener disk, of a yoke provided with guide pins for supporting the same, a spindle supported by said yoke and arranged substantially parallel with the radius of said moistener disk, a plurality of sharp edged presser disks freely mounted upon said spindle, means acting on said yoke to hold said presser disks yieldingly against the face of the moistener disk, and means connected with said guide pins for limiting movement of said presser disks toward said moistener disk.

In testimony whereof I affix my signature in presence of two witnesses.

FRED R. ALLEN.

Witnesses:
  E. I. OGDEN,
  FREDERIC A. GREENE.

Copies of this patent may be obtained for five cents each, by addressing the "Commissioner of Patents, Washington, D. C."